United States Patent
Shipley

(10) Patent No.: US 11,592,275 B2
(45) Date of Patent: Feb. 28, 2023

(54) TAPE MEASURE DEVICE

(71) Applicant: James Shipley, La Marque, TX (US)

(72) Inventor: James Shipley, La Marque, TX (US)

( * ) Notice: Subject to any disclaimer, the term of this patent is extended or adjusted under 35 U.S.C. 154(b) by 0 days.

(21) Appl. No.: 17/543,826

(22) Filed: Dec. 7, 2021

(65) Prior Publication Data

US 2022/0178669 A1  Jun. 9, 2022

Related U.S. Application Data

(60) Provisional application No. 63/123,014, filed on Dec. 9, 2020.

(51) Int. Cl.
  *G01B 3/10* (2020.01)
  *G01B 3/1003* (2020.01)
  *G01B 3/1056* (2020.01)

(52) U.S. Cl.
  CPC ......... *G01B 3/1003* (2020.01); *G01B 3/1056* (2013.01)

(58) Field of Classification Search
  CPC ... G01B 3/1003; G01B 3/1046; G01B 3/1048
  USPC .................................... 33/347, 755, 761, 769
  See application file for complete search history.

(56) References Cited

U.S. PATENT DOCUMENTS

| | | | |
|---|---|---|---|
| 2,347,273 A | 4/1944 | Lyle | |
| 2,816,369 A | 12/1957 | Becker | |
| 3,713,603 A | 1/1973 | Shore | |
| 3,820,249 A * | 6/1974 | Stone | G01C 9/24 D10/69 |
| 5,077,907 A | 1/1992 | Furr | |
| 6,338,204 B1 * | 1/2002 | Howie | G01B 3/1003 33/758 |
| 6,532,676 B2 * | 3/2003 | Cunningham | G01C 15/008 33/286 |
| 6,651,354 B1 | 11/2003 | Odachowski | |
| 7,475,492 B1 * | 1/2009 | Huang | G01B 3/1056 33/DIG. 1 |
| 8,732,973 B2 | 5/2014 | Kucik | |
| 9,170,082 B2 * | 10/2015 | Moreau | G01B 3/1041 |
| D788,611 S | 6/2017 | Anderson | |
| 11,340,054 B2 * | 5/2022 | Khangar | G01B 3/1003 |
| 2001/0034944 A1 * | 11/2001 | Cunningham | G01C 15/008 33/286 |
| 2004/0172846 A1 * | 9/2004 | McRae | G01B 3/1041 33/760 |
| 2005/0144793 A1 * | 7/2005 | Nelson | B43L 13/002 33/42 |
| 2009/0271999 A1 * | 11/2009 | Alker | G01B 3/1041 33/761 |

* cited by examiner

*Primary Examiner* — George B Bennett

(57) ABSTRACT

A tape measure device for measuring pipes includes a spring return positioned in a housing. A tape is engaged to and is loopedly positioned around the spring return. The tape is selectively extensible from a front of the housing via a slot. A recess in a bottom of the housing extends from the front to a back and to proximate to the slot. A hook engaged to a second end of the tape can selectively engage a terminus of a substrate, enabling a user grasping the housing in a hand to extend the tape along the substrate. Indicia on the tape allow measurement of a distance from the second end of the tape. A fastener on the bottom of the housing can selectively engage the substrate to removably engage the housing to the substrate so that the user can release the housing.

12 Claims, 4 Drawing Sheets

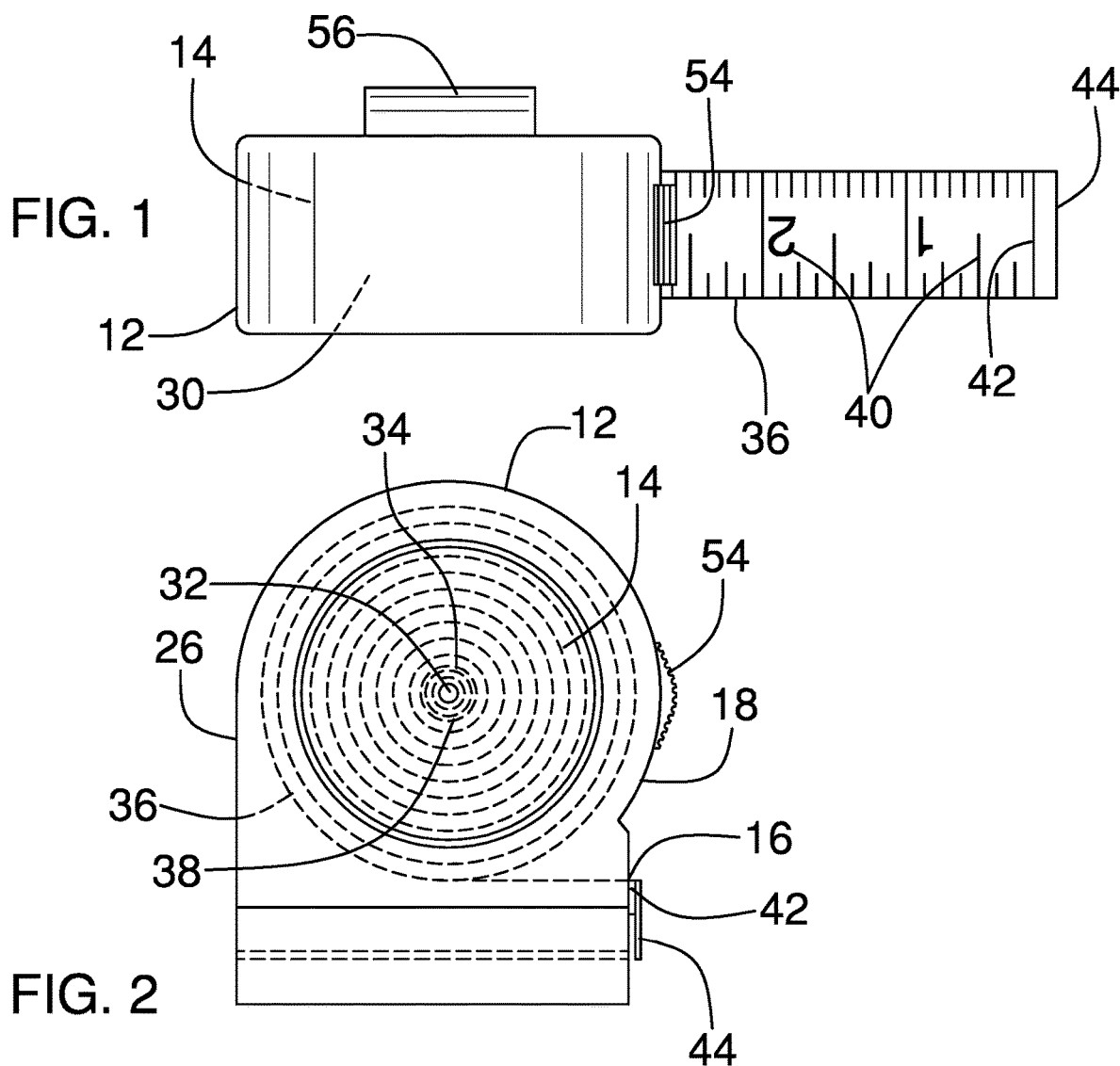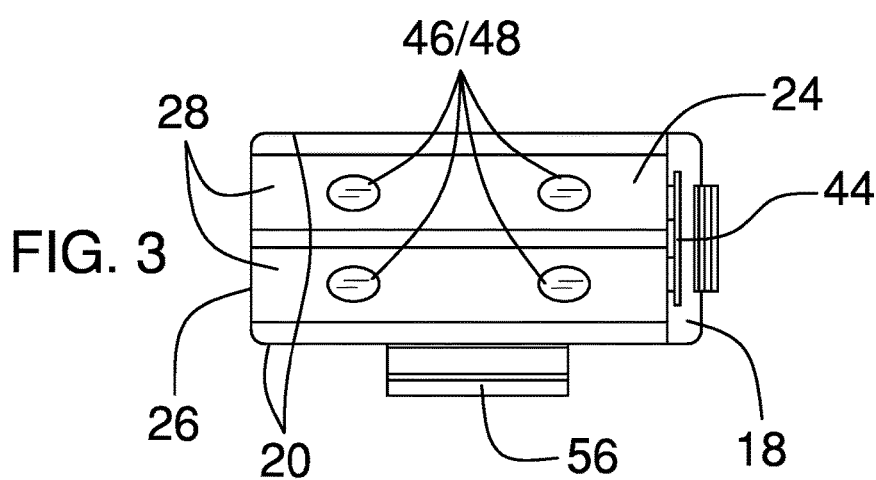

US 11,592,275 B2

TAPE MEASURE DEVICE

CROSS-REFERENCE TO RELATED APPLICATIONS

I hereby claim the benefit under 35 U.S.C. Section 119(e) of U.S. Provisional application 63/123,014 filed Dec. 9, 2020.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to measuring devices and more particularly pertains to a new measuring device for measuring pipes. The present invention discloses a tape measure having a recess to accommodate a pipe and magnets to couple the tape measure to the pipe.

(2) Description of Related Art Including Information Disclosed Under 37 CFR 1.97 and 1.98

The prior art relates to measuring devices, and tape measures in particular. Prior art measuring devices may comprise combination tape measures and levels, devices engageable to both pipes and tape measures, and tape measures having indicia positioned on both faces of the tape. What is lacking in the prior art is a tape measure having a recess to accommodate a pipe and magnets to couple the tape measure to the pipe.

BRIEF SUMMARY OF THE INVENTION

An embodiment of the disclosure meets the needs presented above by generally comprising a housing, which defines an interior space. A slot is positioned in a front of the housing and extends from proximate to opposed sides of the housing. A recess extends into a bottom of the housing, from the front to a back of the housing, and from the bottom to proximate to the slot.

A spring return is engaged to the housing and positioned in the interior space. A first end of tape is engaged the spring return and is loopedly positioned around the spring return so that the tape is selectively extensible from the housing through the slot. A hook is engaged to a second end of the tape and is configured to selectively engage a terminus of a substrate, enabling a user grasping the housing in a hand to extend the tape along the substrate. Indicia engaged to the tape are configured to measure distance from the second end of the tape.

A fastener is engaged to the bottom of the housing and is configured to selectively engage the substrate so that the housing is removably engaged to the substrate. The fastener is configured to engage the substrate so that the user can release the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top view of a tape measure device according to an embodiment of the disclosure.

FIG. 2 is a side view of an embodiment of the disclosure.

FIG. 3 is a bottom view of an embodiment of the disclosure.

DETAILED DESCRIPTION OF THE INVENTION

Figure 4:
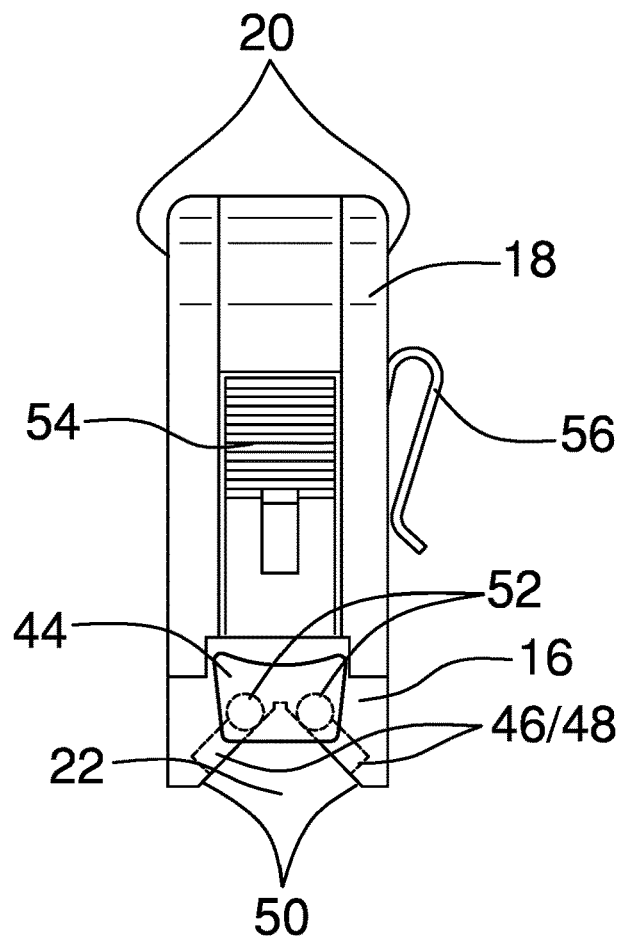
FIG. 4 is a front view of an embodiment of the disclosure.

With reference now to the drawings, and in particular to FIGS. 1 through 7 thereof, a new measuring device embodying the principles and concepts of an embodiment of the disclosure and generally designated by the reference numeral 10 will be described.

As best illustrated in FIGS. 1 through 7, the tape measure device 10 generally comprises a housing 12, which defines an interior space 14. A slot 16 is positioned in a front 18 of the housing 12 and extend from proximate to opposed sides 20 of the housing 12. A recess 22 extends into a bottom 24 of the housing 12, from the front 18 to a back 26 of the housing 12, and from the bottom 24 to proximate to the slot 16.

Figure 5:
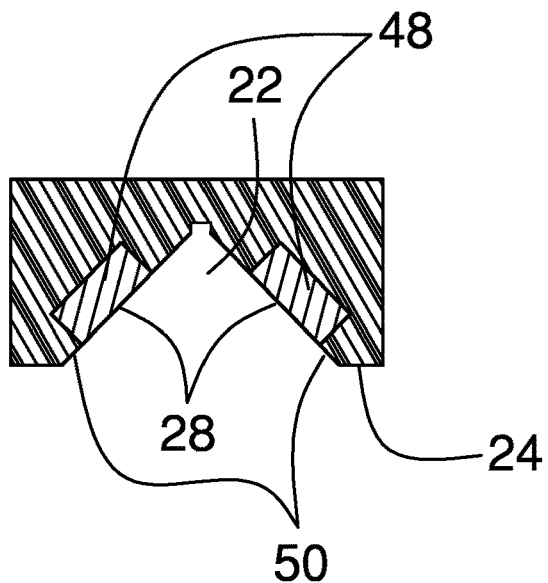
FIG. 5 is a detail cross-sectional view of an embodiment of the disclosure.
Figure 6:
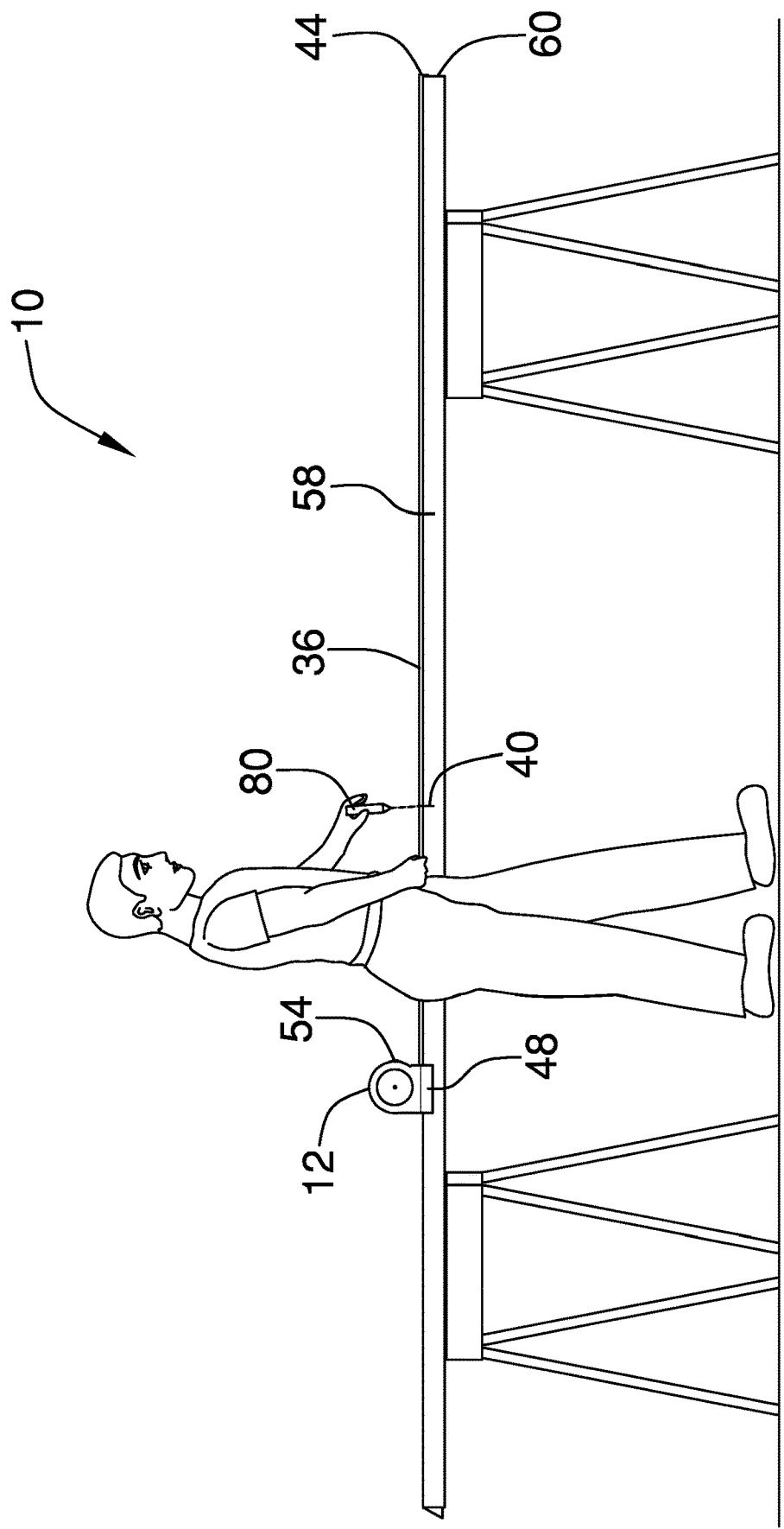
FIG. 6 is an in-use view of an embodiment of the disclosure.
Figure 7:
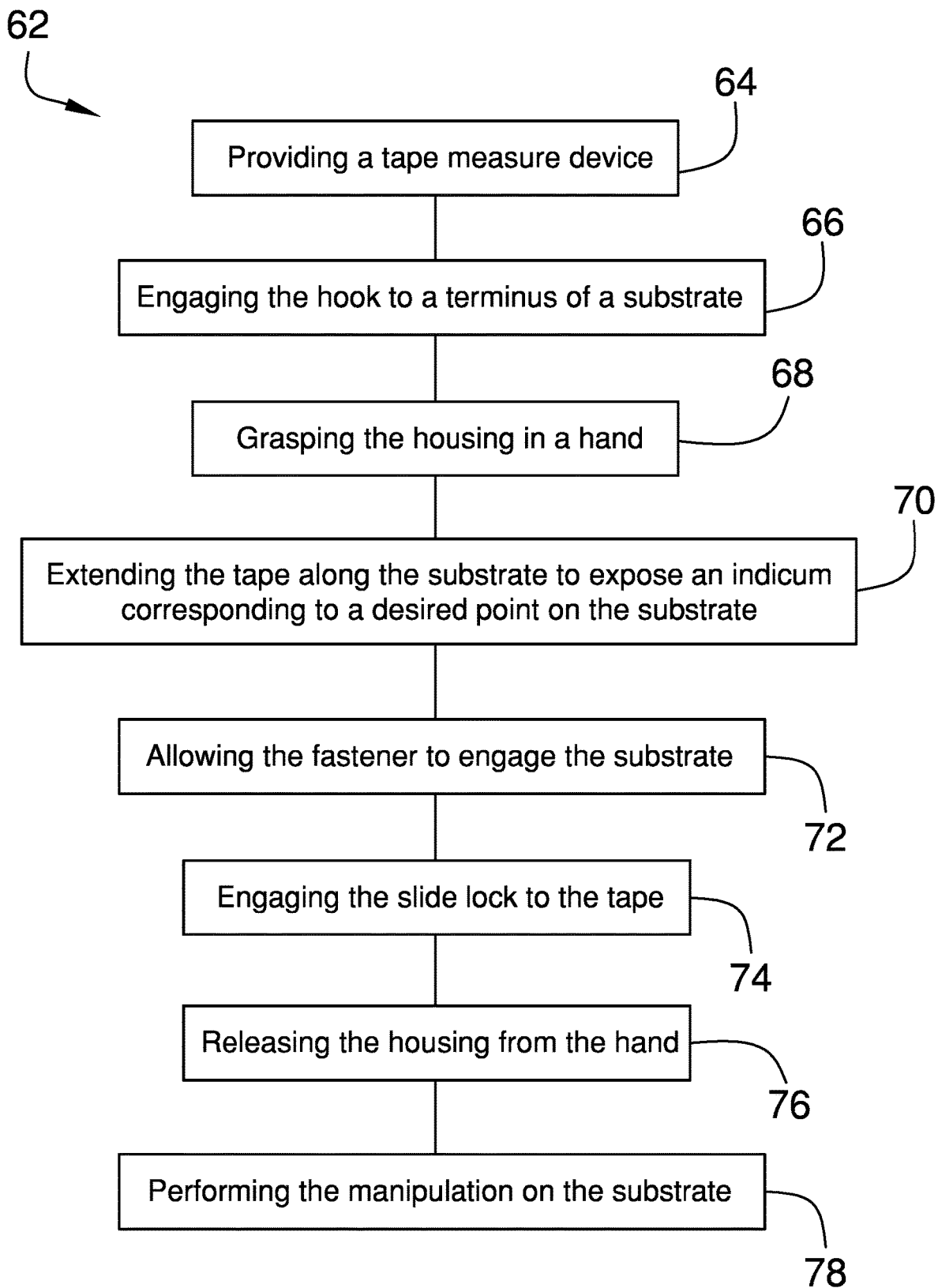
FIG. 7 is a flow diagram for a method utilizing an embodiment of the disclosure.

The recess 22 may be inverted V-shaped when viewed from the front 18 or the back 26 of the housing 12. The present invention anticipates the recess 22 being alternatively shaped, such as, but not limited to, half-oval shaped, semicircularly shaped, rectangularly shaped, and the like. Opposing faces 28 of the recess 22 may be positioned at 90°, as shown in FIG. 5. The present invention also anticipates the opposing faces 28 of the recess 22 being positioned at other angles, such as, but not limited to, 60° and 120°.

A spring return 30 is engaged to the housing 12 and is positioned in the interior space 14. The spring return 30 comprises an axle 32 and a coiled spring 34. The axle 32 is rotationally engaged to the housing 12 and is positioned in the interior space 14. The axle 32 extends between the opposed sides 20 of the housing 12. The coiled spring 34 is engaged to the housing 12 and is positioned in the interior space 14. The coiled spring 34 is operationally engaged to the axle 32.

A first end 38 of a tape 36 is engaged to the spring return 30. The tape 36 is loopedly positioned around the spring return 30 so that the tape 36 is selectively extensible from the housing 12 through the slot 16. Indicia 40 are engaged to the tape 36 and are configured to measure a distance from a second end 42 of the tape 36.

A hook 44 is engaged to the second end 42 of the tape 36 and is configured to selectively engage a terminus 60 of a substrate 58, enabling a user to grasp the housing 12 in a hand to extend the tape 36 along the substrate 58.

A fastener 46 is engaged to the bottom 24 of the housing 12 and is configured to selectively engage the substrate 58 so that the housing 12 is removably engaged to the substrate 58. The fastener 46 is configured to engage the substrate 58 so that the user can release the housing 12.

The fastener 46 may comprise a set of magnets 48, which is engaged to the housing 12 and is positioned in the interior space 14 proximate to the recess 22. The fastener 46 may comprise other fastening means, such as, but not limited to, suction cups, clamps, and the like. The magnets 48 are configured to magnetically couple to a paramagnetic substrate 58, such as a pipe, angle iron, and the like, which is positioned in the recess 22. The set of magnets 48 may comprise four magnets 48 positioned two-apiece proximate to each opposing face 50 of the recess 22, as shown in FIG. 3.

A set of magnetic couplers 52 is engaged to the hook 44. The magnetic couplers 52 are configured to magnetically couple to the terminus 60 of the paramagnetic substrate 58 to secure the hook 44 to the terminus 60. The magnetic couplers 52 deter slippage of the hook 44 from the terminus 60 of the paramagnetic substrate 58. The set of magnetic couplers 52 may comprise two magnetic couplers 52, as shown in FIG. 4.

A slide lock 54 is engaged to the front 18 of the housing 12. The slide lock 54 is selectively engageable to the tape 36 so that the tape 36 is prevented from retracting into the housing 12.

A clip 56 is engaged to a respective opposed side 20 of the housing, as shown in FIGS. 1, 3, and 4. The clip 56 is configured to engage a belt positioned around a waist of the user so that the housing 12 is engaged to the belt.

In use, the tape measure device 10 enables a method 62 of targeting a manipulation of a substrate 58 to a desired point of the substrate 58. The method 62 comprises a first step 64 of providing a tape measure device 10 according to the specification above. A second step 66 of the method 62 is engaging the hook 44 to a terminus 60 of a substrate 58. A third step 68 of the method 62 grasping the housing 12 in a hand. A fourth step 70 of the method 62 extending the tape 36 along the substrate 58 to expose a respective indicum 40 indicating a distance from the second end 42 of the tape 36 corresponding to a desired point on the substrate 58 where a manipulation of the substrate 58 is to be performed. A fifth step 72 of the method 62 allowing the fastener 46 to engage the substrate 58. A sixth step 74 of the method 62 is engaging the slide lock 54 to the tape 36. A seventh step 76 of the method 62 releasing the housing 12 from the hand of the user. An eighth step 78 of the method 62 is performing the manipulation on the substrate 58 at the desired point. The manipulation may comprise simply marking the substrate 58 with a marker 80 at the desired point.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A tape measure device comprising:
   a housing defining an interior space;
   a slot positioned in a front of the housing, the slot extending from proximate to opposed sides of the housing;
   a recess extending into a bottom of the housing, the recess extending from the front to a back of the housing and from the bottom to proximate to the slot;
   a spring return engaged to the housing and positioned in the interior space;
   a tape having a first end, the first end being engaged to the spring return, the tape being loopedly positioned around the spring return, such that the tape is selectively extensible from the housing through the slot;
   a hook engaged to a second end of the tape, wherein the hook is configured for selectively engaging a terminus of a substrate, enabling a user grasping the housing in a hand to extend the tape along the substrate;
   indicia engaged to the tape and being configured for measuring a distance from the second end of the tape; and
   a fastener engaged to the bottom of the housing and being configured for selectively engaging the substrate, such that the housing is removably engaged to the substrate, wherein the fastener is configured for engaging the substrate such that the user can release the housing.

2. The tape measure device of claim 1, wherein the recess is inverted V-shaped when viewed from the front or the back of the housing.

3. The tape measure device of claim 2, wherein opposing faces of the recess are positioned at 90°.

4. The tape measure device of claim 1, wherein the spring return comprises:
   an axle rotationally engaged to the housing and positioned in the interior space, the axle extending between the opposed sides of the housing; and a coiled spring engaged to the housing and positioned in the interior space, the coiled spring being operationally engaged to the axle.

5. The tape measure device of claim 1, wherein the fastener comprises a set of magnets, the magnets being engaged to the housing and positioned in the interior space proximate to the recess, wherein the magnets are configured for magnetically coupling to a paramagnetic substrate positioned in the recess.

6. The tape measure device of claim 3, wherein the fastener comprises a set of magnets, the magnets being engaged to the housing and positioned in the interior space proximate to the recess, wherein the magnets are configured for magnetically coupling to a paramagnetic substrate positioned in the recess the set of magnets comprising four magnets positioned two-apiece proximate to each opposing face of the recess.

7. The tape measure device of claim 1, further including a set of magnetic couplers engaged to the hook, wherein the magnetic couplers are configured for magnetically coupling to the terminus of a paramagnetic substrate for securing the hook to the terminus.

8. The tape measure device of claim 7, wherein the set of magnetic couplers comprising two magnetic couplers.

9. The tape measure device of claim 1, further including a slide lock engaged to the front of the housing, the slide lock being selectively engageable to the tape, such that the tape is prevented from retracting into the housing.

10. The tape measure device of claim 1, further including a clip engaged to a respective opposed side of the housing, the clip being configured to selectively engage a belt positioned around a waist of a user such that the housing is removably engaged to the belt.

11. A method of targeting a manipulation of a substrate at a desired point along a length of the substrate using a tape measure device, the method comprising the steps of:
    providing a tape measure device comprising:
        a housing defining an interior space,
        a slot positioned in a front of the housing, the slot extending from proximate to opposed sides of the housing,
        a recess extending into a bottom of the housing, the recess extending from the front to a back of the housing and from the bottom to proximate to the slot,
        a spring return engaged to the housing and positioned in the interior space,
        a tape having a first end, the first end being engaged to the spring return, the tape being loopedly positioned around the spring return, such that the tape is selectively extensible from the housing through the slot,
        a hook engaged to a second end of the tape,
        a slide lock engaged to the front of the housing, the slide lock being selectively engageable to the tape, such that the tape is prevented from retracting into the housing,
        indicia engaged to the tape and being configured for measuring a distance from the second end of the tape, and
        a fastener engaged to the bottom of the housing and being configured for selectively engaging the substrate, such that the housing is removably engaged to the substrate;
    engaging the hook to a terminus of a substrate;
    grasping the housing in a hand;
    extending the tape along the substrate to expose a respective indicium indicating a distance from the second end of the tape corresponding to a desired point on the substrate where a manipulation of the substrate is to be performed;
    allowing the fastener to engage the substrate;
    engaging the slide lock to the tape;
    releasing the housing from the hand of the user; and
    performing the manipulation on the substrate at the desired point.

12. A tape measure device comprising:
    a housing defining an interior space;
    a slot positioned in a front of the housing, the slot extending from proximate to opposed sides of the housing;
    a recess extending into a bottom of the housing, the recess extending from the front to a back of the housing and from the bottom to proximate to the slot, the recess being inverted V-shaped when viewed from the front or the back of the housing, opposing faces of the recess being positioned at 90°;
    a spring return engaged to the housing and positioned in the interior space, the spring return comprising:
        an axle rotationally engaged to the housing and positioned in the interior space, the axle extending between the opposed sides of the housing, and
        a coiled spring engaged to the housing and positioned in the interior space, the coiled spring being operationally engaged to the axle;
    a tape having a first end, the first end being engaged to the spring return, the tape being loopedly positioned around the spring return, such that the tape is selectively extensible from the housing through the slot;
    a hook engaged to a second end of the tape, wherein the hook is configured for selectively engaging a terminus of a substrate, enabling a user grasping the housing in a hand to extend the tape along the substrate;
    indicia engaged to the tape and being configured for measuring a distance from the second end of the tape;
    a fastener engaged to the bottom of the housing and being configured for selectively engaging the substrate, such that the housing is removably engaged to the substrate, wherein the fastener is configured for engaging the substrate such that the user can release the housing, the fastener comprising a set of magnets, the magnets being engaged to the housing and positioned in the interior space proximate to the recess, wherein the magnets are configured for magnetically coupling to a paramagnetic substrate positioned in the recess, the set of magnets comprising four magnets positioned two-apiece proximate to each opposing face of the recess;
    a set of magnetic couplers engaged to the hook, wherein the magnetic couplers are configured for magnetically coupling to the terminus of the paramagnetic substrate for securing the hook to the terminus, the set of magnetic couplers comprising two magnetic couplers;
    a slide lock engaged to the front of the housing, the slide lock being selectively engageable to the tape, such that the tape is prevented from retracting into the housing; and
    a clip engaged to a respective opposed side of the housing, the clip being configured to selectively engage a belt positioned around a waist of a user such that the housing is removably engaged to the belt.

* * * * *